Figure 4:
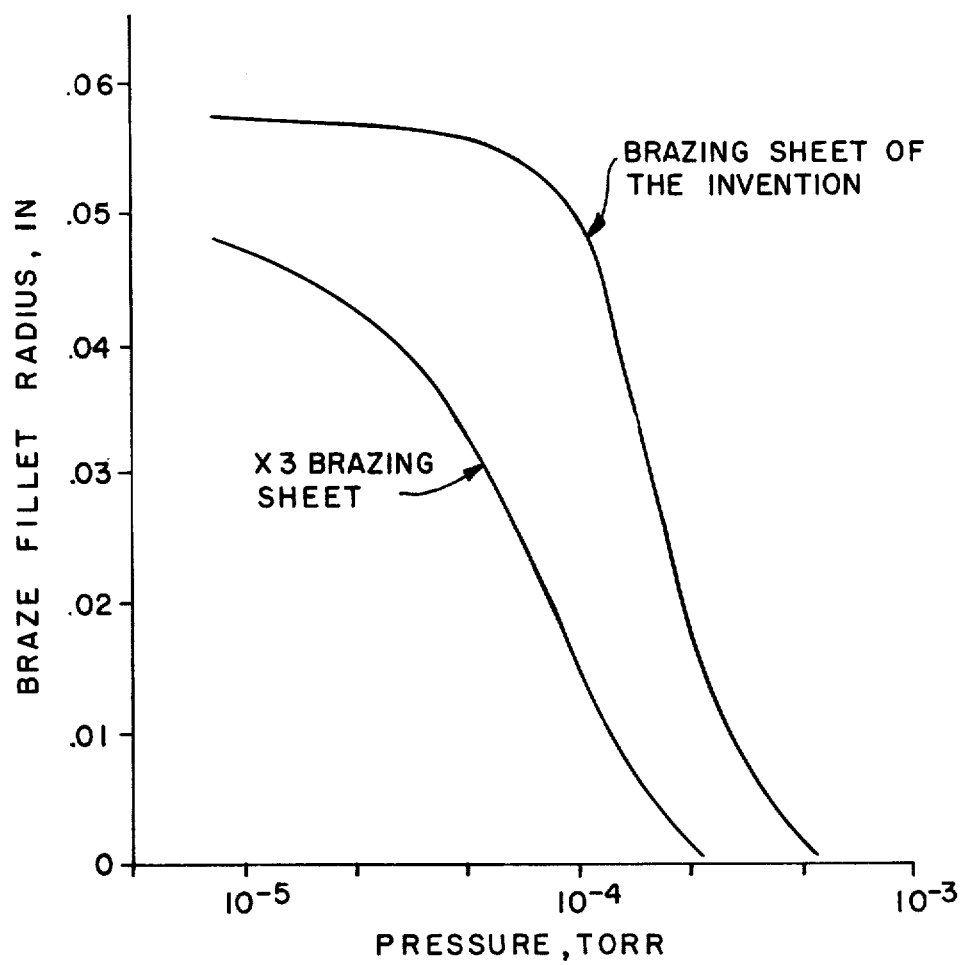

United States Patent [19]
Robinson

[11] 3,891,400
[45] June 24, 1975

[54] ALUMINUM VACUUM BRAZING SHEET

[75] Inventor: Ivan B. Robinson, Livermore, Calif.

[73] Assignee: Kaiser Aluminum & Chemical Corporation, Oakland, Calif.

[22] Filed: Feb. 8, 1973

[21] Appl. No.: 330,709

[52] U.S. Cl. .............................................. 29/197.5
[51] Int. Cl. ............................................ B32b 15/00
[58] Field of Search .................................. 29/197.5

[56] References Cited
UNITED STATES PATENTS

| | | | |
|---|---|---|---|
| 2,821,014 | 1/1958 | Miller | 29/197.5 |
| 3,322,517 | 5/1967 | Miller | 29/197.5 |
| 3,342,565 | 9/1967 | Munday | 29/197.5 |
| 3,440,712 | 4/1969 | Stroup | 29/197.5 |
| 3,788,824 | 1/1974 | Singleton, Jr. et al. | 29/197.5 |

*Primary Examiner*—L. Dewayne Rutledge
*Assistant Examiner*—Arthur J. Steiner
*Attorney, Agent, or Firm*—Paul E. Calrow; Edward J. Lynch

[57] ABSTRACT

This invention relates to an improved magnesium source for the vacuum brazing of aluminum members, the source comprising a magnesium-containing member clad with a magnesium-free aluminum alloy. The cladding effectively prevents the premature vaporization of the magnesium during vacuum brazing operations and also prevents the formation of a complex magnesium-containing oxide film on the magnesium source.

6 Claims, 4 Drawing Figures

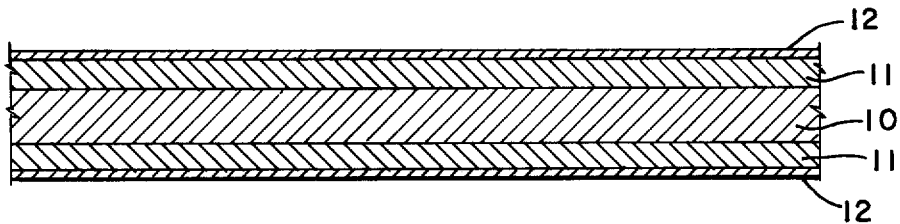
F I G. 1
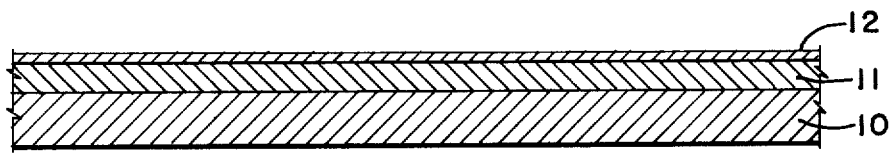
F I G. 2
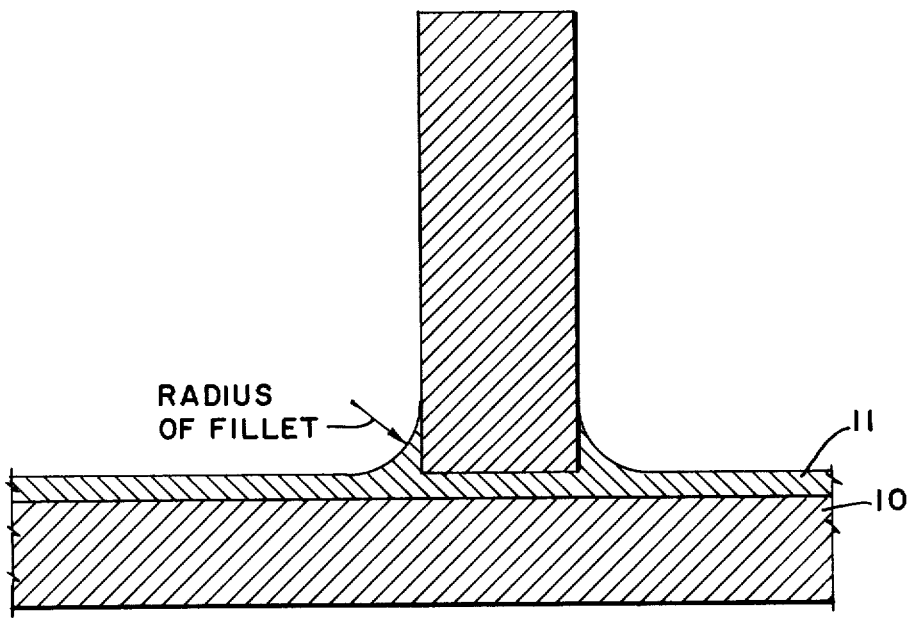
F I G. 3

ALUMINUM VACUUM BRAZING SHEET

BACKGROUND

This invention relates to the process of vacuum brazing metal products and, more specifically, relates to a clad product particularly useful in the vacuum brazing process.

The fluxless vacuum brazing process, which is basically described by Gunow et al. in U.S. Pat. No. 2,943,181, generally comprises subjecting the metal parts to be joined to the action of a reactive metal vapor in a high temperature, low pressure environment. Usually, a brazing alloy is disposed between the surfaces to be joined. The reactive metal vapor apparently removes substantially all remaining oxygen from the atmosphere surrounding the metal parts and also disrupts or removes any oxide film on the metal parts so that the oxide film does not interfere with the flow of brazing alloy at the operating temperatures. The vacuum brazing process can be employed to join many various metals, including steel, titanium, zirconium, aluminum and the like.

In the vacuum brazing of aluminum products, magnesium vapor has been almost exclusively used as the gettering agent. The magnesium source can be magnesium metal which is placed in the furnace chamber prior to heat-up, but, most frequently, a brazing alloy is employed which contains significant amounts of magnesium. Conventional aluminum vacuum brazing sheet generally is a composite sheet comprising a core of 3003 aluminum alloy or 6951 aluminum alloy and a cladding of X4003 aluminum alloy, X4004 aluminum alloy or X4005 aluminum alloy. As used herein, all numbered aluminum alloys are the Aluminum Association designated alloys. The various commercially available vacuum brazing sheets are described below in Tables 1 and 2.

In commercial vacuum brazing operations, particularly with semicontinuous furnace operations, low quality brazed joints frequently result due in part apparently to the premature vaporization of magnesium in the furnace chamber. Apparently, air, which normally leaks into the furnace, recontaminates the surfaces which have been "activated" by magnesium vapors and moreover reacts with any magnesium vapors remaining in the furnace atmosphere. Furthermore, in the typical operation of a semicontinuous vacuum furnace, intermittent loads of contamination, e.g., water or oxygen, enter the high vacuum chamber as new parts are introduced, and, thus, further contamination of activated surfaces may occur after the burst of magnesium vapor but prior to the melting and flowing of the brazing filler alloy. Moreau et al. in U.S. Pat. No. 3,673,678 sought to avoid the premature burst or vaporization of magnesium by backfilling the furnace with inert gas to retard at least part of the vaporization of magnesium until just before the brazing temperature is reached. While the method proposed may be fairly effective, furnace control is very difficult, particularly with semicontinuous vacuum brazing furnaces.

Low quality brazements are also frequently encountered when utilizing vacuum brazing sheet which has a magnesium-containing cladding. The unsound brazements are apparently due to the presence of a complex, magnesium-oxide-containing film on the surface of the brazing sheet which interferes with the flow or filleting of the brazing alloy. The magnesium vapors have little or no effect on this type of film. The film, which is formed under a variety of circumstances, for example, during annealing, can be removed mechanically, but this requires an additional, inconvenient process step.

Against this background, the present invention was developed.

DESCRIPTION OF THE INVENTION

The present invention provides an improved magnesium source for the vacuum brazing of aluminum products which significantly retards the vaporization of magnesium during furnace heat-up and also effectively precludes the formation of a magnesium oxide-containing film on the magnesium source. The magnesium source of the present invention is a magnesium-containing metal selected from the group consisting of magnesium metal, a magnesium alloy or an aluminum alloy containing at least 0.5 percent by weight magnesium which is clad with an essentially magnesium-free aluminum alloy having a liquidus at least 50°F. above the liquidus of the magnesium-containing metal and preferably above the brazing temperature which normally ranges from about 1100°–1150°F. As used herein, the term "magnesium-free" refers to an alloy containing no more than 0.1 percent by weight magnesium.

In accordance with the invention during heat-up, the magnesium-containing metal melts and begins dissolving the magnesium-free aluminum alloy cladding.

Table 1

| | Brazing Sheet Number* | | | | | |
|---|---|---|---|---|---|---|
| | X3 | X5 | X7 | X8 | X9 | X14 |
| Core Alloy | 3003 | 6951 | 3003 | 3003 | 3003 | 6951 |
| Cladding Alloy | X4003 | X4003 | X4004 | X4004 | X4005 | X4004 |

*Aluminum Association Designation

Table 2

| | Alloy Composition* (Per Cent by Weight) | | | | | | |
|---|---|---|---|---|---|---|---|
| Alloy | Si | Fe | Cu | Mn | Mg | Zn | Al |
| 3003 | 0.6 | 0.7 | 0.05 – 0.20 | 1.0 – 1.5 | — | 0.10 | Balance |
| 6951 | 0.2 – 0.5 | 0.8 | 0.15 – 0.40 | 0.10 | 0.4 – 0.8 | 0.20 | Balance |
| X4003 | 6.8 – 8.2 | 0.8 | 0.25 | 0.10 | 2.0 – 3.0 | 0.20 | Balance |
| X4004 | 9.0 – 10.5 | 0.8 | 0.25 | 0.10 | 1.0 – 2.0 | 0.20 | Balance |
| X4005 | 9.5 – 11.0 | 0.8 | 0.25 | 0.10 | 0.20 – 1.0 | 0.20 | Balance |

*Unless shown as a range, the composition is per cent maximum

Significant vaporization of magnesium does not occur until the cladding is penetrated by the underlying molten magnesium-containing metal. So long as the melting point requirements set forth above are met, the composition of the magnesium-free aluminum alloy cladding is not particularly critical unless the cladding becomes an integral part of the brazed joint. No alloying constituents should be included in the magnesium-free aluminum alloy cladding which will detrimentally affect the flowing or filleting of the brazing alloy or the characteristics of the brazed joint.

With reference to FIGS. 1 and 2, preferably, the magnesium source of the present invention is a sheet product comprising an aluminum core 10, a magnesium containing (i.e., more than 0.5 percent Mg) brazing alloy layer 11 clad to the core 10 and a magnesium-free aluminum alloy layer 12 clad to the brazing alloy layer 11. As indicated in the Figures, one or both sides of the core can be clad with the magnesium-containing and magnesium-free layers. The core and the magnesium-free cladding alloys must have a liquidus considerably higher than the brazing alloy. The liquidus temperature of the magnesium-free layer is preferably not below the brazing temperature. The liquidus temperature of the core, of course, must be above the brazing temperature. The composition of the core and magnesium-free cladding alloys is not particularly critical so long as the composition does not detrimentally affect the brazing process or brazed joint. Generally, the magnesium-free alloy and the core alloy should contain less than 5% zinc, 0.8% iron, 1% silicon, 3% manganese, 0.5% chromium, 0.05% titanium and other elements 0.10% each. The core alloy may also contain magnesium up to 2.5%. The above limits generally relate to the alloying of individual elements by themselves. Suitable alloys for the core and magnesium-free cladding include 1100 and 3003 aluminum alloys. Aluminum alloys 6951 and 7005 can also be used as core alloys. The brazing alloy is an aluminum alloy consisting essentially of about 5–15% by weight silicon, 0.5 to 5% by weight magnesium, 0.8% by weight maximum iron, 0.25% by weight maximum copper, 0.20% by weight maximum zinc, 0.20% by weight maximum manganese, other elements 0.10% by weight maximum each and the balance aluminum. For most commercial applications, the sheet product will comprise a core which is clad on both sides with the magnesium-free alloy and the magnesium-containing brazing alloy. To facilitate cladding, interliners of thin, relatively pure aluminum, e.g., 1100 alloy, may be disposed between the various layers.

The thickness of the magnesium-free aluminum cladding depends to a considerable extent upon the magnesium burst temperature desired and the composition of the magnesium-containing alloy beneath the cladding. As indicated hereinabove, the magnesium-free cladding must be dissolved away at least in part by the magnesium-containing underlayer during heat-up to brazing temperatures. Subject to the above, the thickness of the magnesium-free layer generally can range from about 0.00001 to about 0.25 inch. Usually, the thickness of the magnesium-free cladding ranges from about 0.1 to 20% of the thickness of the magnesium-containing alloy member. Cladding thicknesses below about 0.0001 inch are very difficult to obtain by conventional roll bonding techniques. Substantially all commercially available aluminum vacuum brazing sheet is below 0.1 inch in thickness because to date most vacuum brazing has been limited to joining relatively thin members. However, vacuum brazing can be conducted successfully on thick members if it is so desired.

The preferred embodiment of the present invention is most conveniently prepared by cleaning the mating surface to remove excess oxide, grease, dirt and the like, heating to a temperature between about 600° to 900°F, and then roll bonding. The magnesium-free layer is first roll bonded to the magnesium-containing surfaces and then this clad product is roll bonded to the core. To facilitate the formation of a good metallurgical bond during fabrication, it is sometimes desirable to interpose thin layers of relatively pure aluminum, e.g., 1100 alloy, between the various members prior to bonding.

In accordance with a preferred embodiment of the present invention, aluminum members to be joined are positioned in the desired relationship with the vacuum brazing sheet of the present invention in contact with at least one of the parts to be joined. The assembly is then subjected to temperatures between about 1100° and 1150°F. and a pressure less than $10^{-2}$ Torr (10 microns of mercury at 0°C.) until the brazing alloy layer in the vacuum brazing sheet melts, dissolves the overlying magnesium-free layer and flows, thereby forming a fillet with the part in contact with said sheet. The assembly is then cooled to allow the thus-formed fillet to solidify.

As a general rule, the quality of a brazed joint is a function of the radius of the fillet which forms at the joint during brazing. This radius is shown in FIG. 3 which illustrates a typical brazed joint. Generally, the larger the radius of the fillet, the higher the quality of the brazement. For commercially acceptable T-joints and the like, the radius of the fillet must usually exceed the thickness of the part to be brazed and for high quality brazements, the radius is preferably greater than twice the thickness. However, heretofore, to obtain a large radius, the contaminant level in the furnace must be kept extremely low, thus requiring extremely low pressures. For example, for most commercial furnaces, the pressure must be maintained at less than about $5\times10^{-5}$ Torr ($5\times10^{-2}$ microns), preferably around $1\times10^{-5}$ Torr ($1\times10^{-2}$ microns), to obtain high quality brazements. With the magnesium source of the present invention, it has been found that sound commercially acceptable brazements can be obtained at pressures as high as $2\times10^{-4}$ Torr (0.2 micron). Some brazing occurs at pressures as high as $10^{-2}$ Torr (10 microns). Moreover, because the product of the present invention is clad with essentially magnesium-free aluminum alloy, no complex magnesium oxide-containing films are formed on the product which can detrimentally affect the quality of the brazed joint.

To illustrate the advantages of the present invention, several T-joint brazements were made utilizing the preferred vacuum brazing sheet of the present invention and No. X7 Brazing Sheet with the joint construction shown in FIG. 3. The vacuum brazing sheet of the present invention comprised a core of 3003 alloy 0.014 inch thick, a brazing alloy (X4004) 0.003 inch thick clad to both surfaces of the core, and a surface cladding of 3003 alloy 0.00005 inch thick. The No. X7 Brazing Sheet was 0.02 inch thick with the cladding being 15 percent of the composite thickness. Conventional pretreatments and brazing practices were employed. The brazing was conducted at 1130°F. and at various pressures ranging from about $1\times10^{-5}$ Torr ($10^{-2}$ microns) to about $5\times10^{-4}$ Torr ($5\times10^{-1}$ micron). The fillet radii formed at the various pressures were measured to obtain an indication of the soundness of each of the joints. These are indicated below in Table 3.

Table 3

|  | Fillet Radius, in | | | |
|---|---|---|---|---|
|  | Pressure, Torr | | | |
|  | $1\times10^{-5}$ | $1\times10^{-4}$ | $2\times10^{-4}$ | $5\times10^{-4}$ |
| No. X3 Brazing Sheet | 0.048 | 0.016 | 0.002 | No Bond |
| Brazing Sheet of the Invention | 0.057 | 0.05 | 0.018 | 0.002 |

As indicated by the data, the vacuum brazing sheet of the present invention allows for a magnitude higher pressure than standard vacuum brazing sheet with no loss in the quality of the weldments. This data is shown graphically in FIG. 4.

It is obvious that various modifications and improvements can be made to the present invention without departing from the spirit of the invention or the scope of the appended claims.

What is claimed is:

1. An aluminum vacuum brazing sheet comprising an aluminum alloy core, clad on at least one side of said core is a layer of an aluminum brazing alloy consisting essentially of about 5–15 percent by weight silicon, about 0.5–5 percent by weight magnesium and the balance aluminum and inconsequential amounts of other elements, and clad on said brazing alloy layer is an essentially magnesium-free aluminum alloy layer, said core and said magnesium-free layer having a liquidus temperature considerably higher than the liquidus temperature of said brazing alloy layer.

2. The vacuum brazing sheet of claim 1 wherein the liquidus temperature of said magnesium-free alloy is at least 50°F. higher than the liquidus temperature of said brazing alloy.

3. The vacuum brazing sheet of claim 1 wherein the thickness of said magnesium-free layer ranges from about 0.0001 inch to about 0.25 inch.

4. The vacuum brazing sheet of claim 1 wherein said magnesium-free alloy is selected from the group consisting of 3003 and 1100 aluminum alloys.

5. The vacuum brazing sheet of claim 1 wherein said brazing alloy contains 0.8 percent by weight maximum iron, 0.25 percent by weight maximum copper, 0.20 percent by weight maximum zinc, 0.20 percent by weight maximum manganese and 0.1 percent by weight maximum other elements each.

6. The vacuum brazing sheet of claim 1 wherein a layer of said aluminum brazing alloy is clad on each side of said core and a magnesium-free aluminum alloy layer is clad on the exposed sides of said brazing alloy layer.

* * * * *